United States Patent
Lee et al.

(10) Patent No.: US 10,250,934 B2
(45) Date of Patent: *Apr. 2, 2019

(54) MOBILE TO SET-TOP BOX LINKING

(71) Applicant: Cox Communications, Inc., Atlanta, GA (US)

(72) Inventors: Terry Douglas Lee, Lawrenceville, GA (US); Yousef Wasef Nijim, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/582,458

(22) Filed: Dec. 24, 2014

(65) Prior Publication Data

US 2015/0121415 A1   Apr. 30, 2015

Related U.S. Application Data

(62) Division of application No. 13/045,476, filed on Mar. 10, 2011, now Pat. No. 8,929,876.

(60) Provisional application No. 61/426,163, filed on Dec. 22, 2010.

(51) Int. Cl.
| | |
|---|---|
| *H04N 7/16* | (2011.01) |
| *H04N 21/41* | (2011.01) |
| *H04N 21/258* | (2011.01) |
| *H04N 21/422* | (2011.01) |
| *H04M 1/725* | (2006.01) |
| *H04N 21/4223* | (2011.01) |
| *H04N 21/45* | (2011.01) |
| *H04N 21/4788* | (2011.01) |
| *H04N 21/61* | (2011.01) |

(52) U.S. Cl.
CPC ...... *H04N 21/4126* (2013.01); *H04M 1/7253* (2013.01); *H04N 21/25816* (2013.01); *H04N 21/4222* (2013.01); *H04N 21/4223* (2013.01); *H04N 21/42221* (2013.01); *H04N 21/42222* (2013.01); *H04N 21/4508* (2013.01); *H04N 21/4788* (2013.01); *H04N 21/6118* (2013.01)

(58) Field of Classification Search
CPC ............ H04N 5/4403; H04N 1/00307; H04N 21/42204; H04N 21/4126; H04N 21/25816; H04N 21/4222; H04N 21/42221; H04N 21/42222; H04N 21/4223; H04N 21/4508; H04N 21/4788; H04N 21/6118; H04L 12/2898; H04M 1/7253

See application file for complete search history.

(56) References Cited

U.S. PATENT DOCUMENTS

| | | | | |
|---|---|---|---|---|
| 5,671,267 | A * | 9/1997 | August | H04M 1/72502 379/102.03 |
| 8,634,390 | B2 | 1/2014 | Ramakrishnan et al. | |
| 8,806,521 | B2 * | 8/2014 | Keen | B64D 11/0015 725/23 |

(Continued)

*Primary Examiner* — Kyu Chae
(74) *Attorney, Agent, or Firm* — Merchant & Gould

(57) ABSTRACT

Allowing a user of a mobile computing device to link the mobile computing device and its associated network or system to a subject piece of hardware operating via a second network or system is provided. After the mobile computing device is linked to a given hardware device, functional operation of the hardware device and access to accounts associated with the hardware device may be provided to the linked mobile computing device.

12 Claims, 6 Drawing Sheets

(56) References Cited

U.S. PATENT DOCUMENTS

| | | | | |
|---|---|---|---|---|
| 8,929,876 B2* | 1/2015 | Lee | ................ | H04N 21/25816 455/41.2 |
| 2009/0172757 A1* | 7/2009 | Aldrey | ................ | H04N 7/165 725/110 |
| 2014/0298369 A1* | 10/2014 | Gagnon | ............ | H04N 21/4122 725/25 |
| 2016/0066050 A1* | 3/2016 | Gerhards | ........... | H04N 21/4126 725/58 |

* cited by examiner

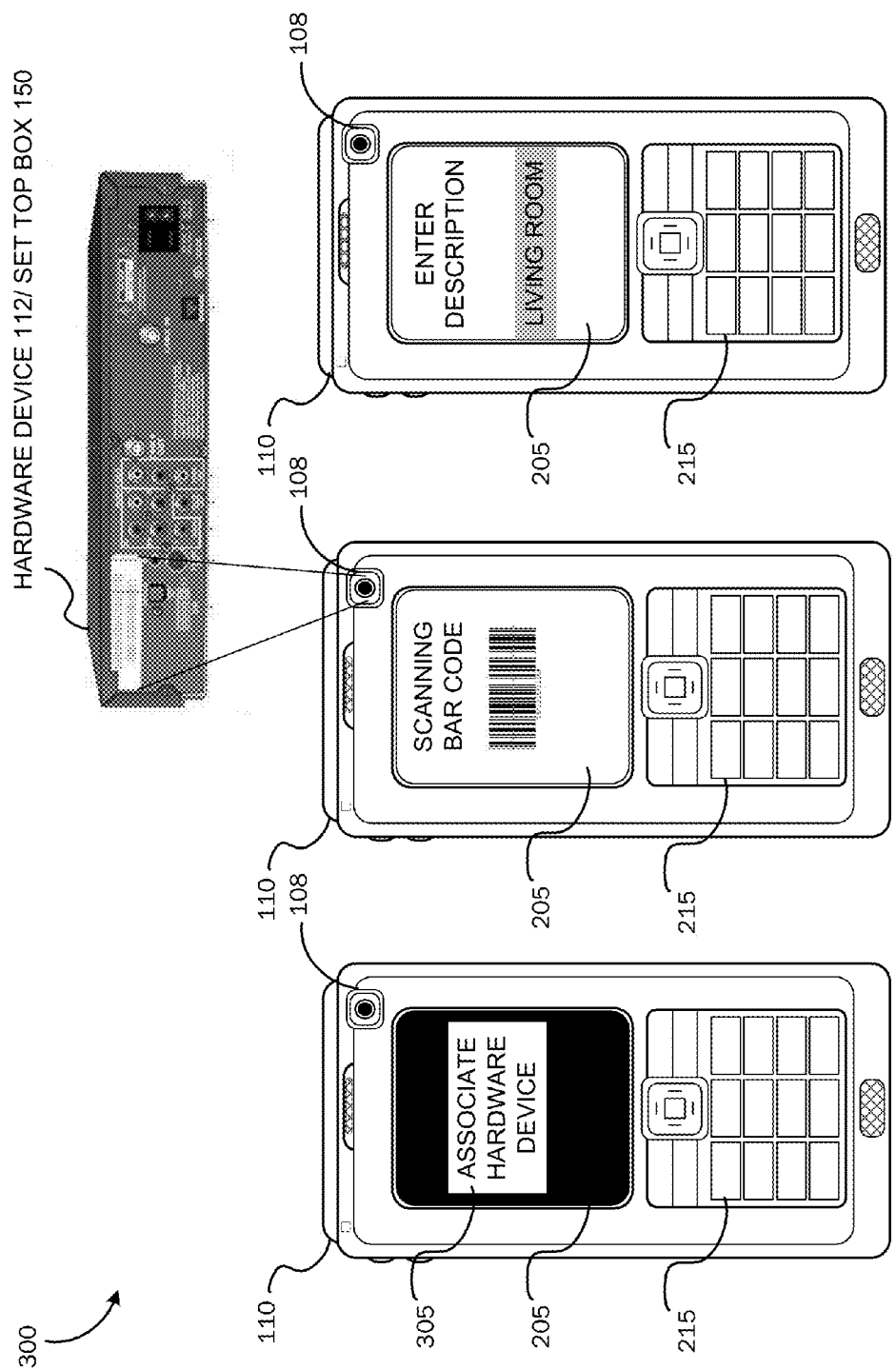

MOBILE TO SET-TOP BOX LINKING

CROSS REFERENCE TO RELATED APPLICATIONS

The present application is a divisional of and claims priority to U.S. Utility patent application Ser. No. 13/045,476 filed Mar. 10, 2011, which claims priority to U.S. Provisional Patent Application No. 61/426,163 filed Dec. 22, 2010, the disclosures of which are hereby incorporated by reference in their entirety.

BACKGROUND

Communications between mobile computing devices, their designated wireless networks, and other computerized networks through the Internet has become commonplace through the use of mobile computing devices such as smart-phones, personal digital assistants, lap-top computers, and the like. In many cases, these mobile computing devices may gain access and control over a user's various accounts, both business and personal, by provisioning communications between two or more networks, wireless or otherwise. In these cases, a user may exercise specific control over a given account such as changing account settings, adjusting service levels, and/or modifying the user's personal information, and so on.

In today's electronic and mobile environment, it is common for a user of a mobile computing device to link one network to another network or to a hardware device through a defined protocol established by the mobile computing device network provider and any other network involved. However, often such a protocol may not be as user-friendly as desired by the user. For example, one protocol to link networks and/or hardware devices may require accessing an account through a website via an Internet connection, entering a number or code provided by a hardware device or second network, all while communicating over a third party network. Another scenario may require a user to call technical support and request permission to establish communications between networks and/or hardware, or to obtain permission to control a device. As can be appreciated by those skilled in the art, linking mobile computing devices and their respective networks to other networks or to hardware devices in a simplified manner may provide useful benefits for the user.

It is with respect to these and other considerations that the present invention has been made.

SUMMARY

The above and other problems are solved by allowing a user of a mobile computing device to link the mobile computing device and its associated network or system to a second network or system for permitting the mobile computing device to have functional operation within the second network or system.

According to one embodiment, a mobile computing device, for example, a wireless telephone operating over its designated wireless network may be linked to a piece of hardware operating via a second network or system. Once the mobile computing device is linked to the subject piece of hardware, operational control over the subject piece of hardware may be exercised from the mobile computing device. For example, a wireless telephone may be linked to a cable television services system set-top box to allow operational control of the set-top box (e.g., setting viewing channels, controlling recording devices, etc.) from the linked wireless telephone. In addition to operational control over the subject piece of hardware, the mobile computing device may be used to access and edit if desired account information associated with the subject piece of hardware.

The mobile computing device may be linked to the subject piece of hardware and its associated network or operating system by registering the mobile computing device with the associated network or operating system to allow the mobile computing device to obtain operational control over the subject piece of hardware. The mobile computing device may obtain identification information from the subject piece of hardware that may be passed to the network or operating system associated with the subject piece of hardware and that may be used to associate the mobile computing device with the subject piece of hardware. According to embodiments, identification information may be obtained by communication between the mobile computing device and the subject piece of hardware according to a variety of means. According to one aspect, a bar code label affixed to or associated with the subject piece of hardware may be photographically captured by the mobile computing device and identification information encoded on the bar code label may be used to register the mobile computing device with the network or operating system associated with the subject piece of hardware. According to another aspect, the subject piece of hardware may transmit identification information to the mobile computing device via infrared communication, Bluetooth communication, Wireless Fidelity (Wi-Fi) communication, Radio Frequency Identification (RFID) communication, and the like.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIGS. 3A, 3B, and 3C are simplified block diagrams illustrating example screenshots on a mobile computing device utilizing embodiments of the present invention.

DETAILED DESCRIPTION

As briefly described above, embodiments of the present invention are directed to allowing a user of a mobile computing device to link the mobile computing device and its associated network or system to a subject piece of hardware operating via a second network or system for permitting the mobile computing device to have functional operation within the second network or system with respect to the subject piece of hardware. For example, a wireless telephone may be linked to a cable television services system set-top box to allow operational control of the set-top box (e.g., setting viewing channels, controlling recording devices, etc.) from the linked wireless telephone. In addition to operational control over the subject piece of hardware, the mobile computing device may be used to access and edit, if desired, account information associated with the subject piece of hardware.

According to embodiments, the term "mobile computing device" will be used herein to describe a mobile wireless electronic communication device, such as a wireless telephone, handheld computer, personal digital assistant (PDA), laptop computer, and the like capable of sending and receiving electronic communications. A second network or system with which a mobile computing device may register via a subject piece of hardware associated with the second network or system may include, but not be limited to, cable television services (CATV) providers, Satellite TV (SATV) services providers, ISP's (Internet Service Providers), and the like. A subject piece of hardware over which a mobile computing device may exercise control according to embodiments may include, but not be limited to, a CATV or SATV set-top box, DVR (Digital Video Recorder), modem, router, wireline or wireless telephone device or system, a server computer, etc. That is, any piece of hardware that is operated via a network or system may be accessed and controlled via a mobile computing device that is properly registered with the network or system within which the piece of hardware operates.

Figure 1A:
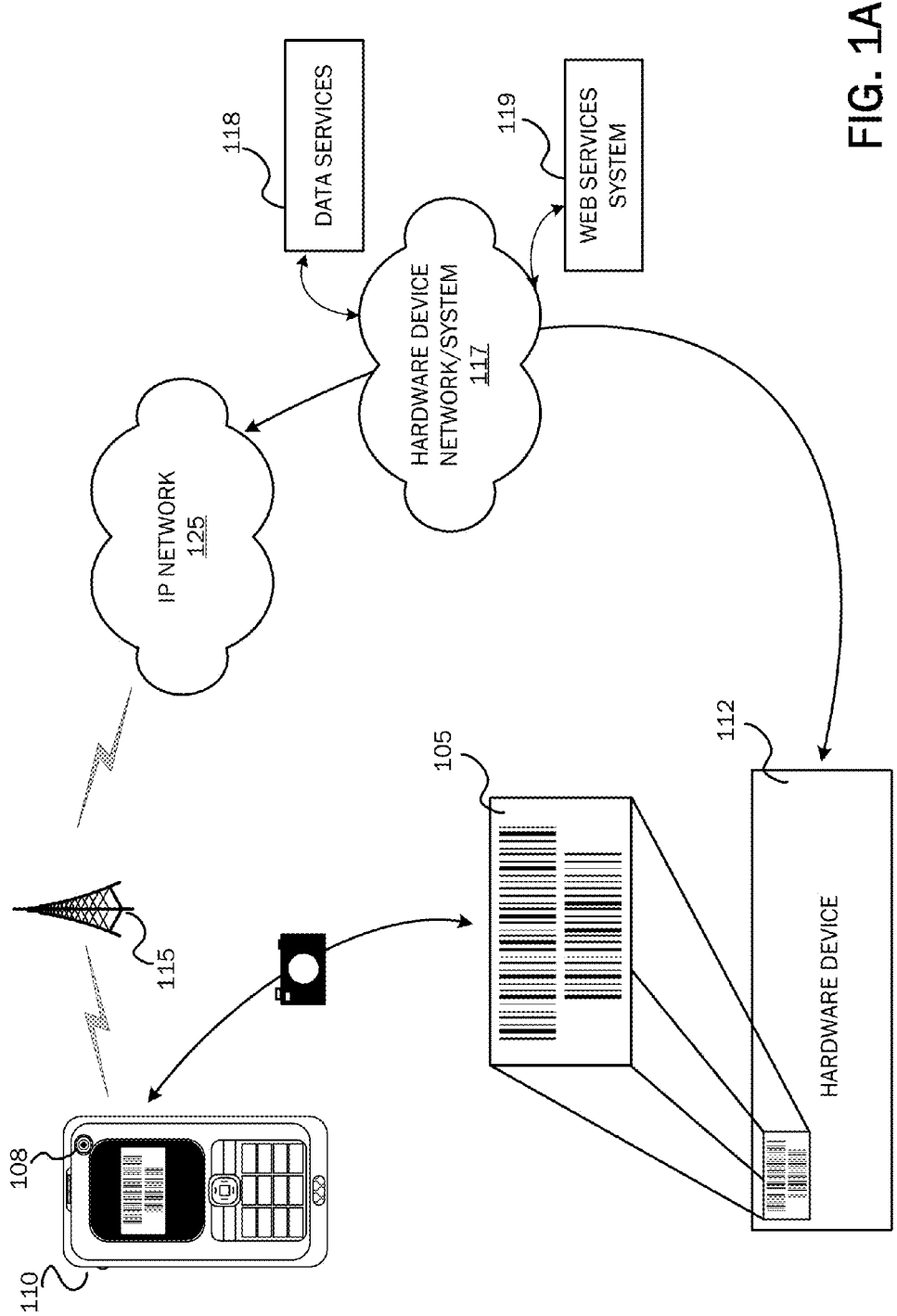
FIG. 1A is a simplified block diagram illustrating an example operating environment for embodiments of the present invention.

FIG. 1A is a simplified block diagram illustrating an example operating environment for embodiments of the present invention. Referring to FIG. 1A, as described above, a mobile computing device 110, for example, a wireless telephone, may be associated with a given hardware device, for example, a CATV set-top box, and the mobile computing device may be registered with a network or system 117 in which the hardware device operates, for example, a CATV system, to allow the mobile computing device to operationally interact with the hardware device, such as allowing the mobile computing device to be used to change settings of the example set-top box or access account information for the example set-top box.

In order to register the mobile computing device with the network or system associated with the hardware device, the mobile computing device 110 may be used to capture identification information 105 for the hardware device that may be passed to the network or system 117 for associating the mobile computing device with the subject hardware device 112. Identification information for the hardware device captured by the mobile computing device may include a media access control (MAC) address, a serial number, a model number, a date of manufacture, date of installation, and any other information associated with the hardware device that may be used to positively identify the hardware device to the network or system 112 through which it operates.

The identification information for the hardware device may be captured using the mobile computing device according to a number of available methods. According to one embodiment, a bar code label affixed to or associated with the subject piece of hardware 112 may be photographically captured by the mobile computing device and identification information encoded on the bar code label may be used to register the mobile computing device with the network or operating system 117 associated with the subject piece of hardware. The identification information 105 may be captured via a mobile computing device image capture mechanism 108, for example, an onboard camera 108. According to this embodiment, a user of the mobile computing 110 may photograph the bar code 105 affixed to the hardware device 112, and the information encoded on the bar code label, may be used to register the mobile computing device with the network or system 117, as described below.

According to another embodiment, the subject hardware device 112 may transmit identification information to the mobile computing device via wireless communication, such as infrared communication, Bluetooth communication, Wireless Fidelity (Wi-Fi) communication, Radio Frequency Identification (RFID) communication, and the like. For example, the mobile computing device may be used to transmit a request to the hardware device which in turn responds with the requested identification information, or a button or other functionality control associated with the hardware device may be selected to cause the identification information to be sent to the mobile computing device.

After the identification information for the hardware device is received by the mobile computing device according to any of the acceptable methods described above, the identification information may be electronically transmitted from a network 115 associated with the mobile computing device 110 through a distributed computing network, such as the Internet 125, to the network or system 117 associated with the subject hardware device. Following with the example described above, a wireless telephone 110 may photographically capture identification information from a bar code affixed to a CATV set-top box, and the captured information may be sent to a CATV system under which the set-top box operates to register the wireless telephone with the CATV to allow the wireless telephone to be used to interact with and control the set-top box. For another example, a hardware device 112 may be one or more DVR's, and the mobile computing device 110 may be locally or remotely provisioned to set a recording schedule, control channel selections, power on and power off the device, and the like. In addition to controlling the functionality of the hardware device 112, a user of a mobile computing device 110 may access and control account information associated with the hardware device or with an account at the network or system 117 associated with the hardware device 112. For example, once the mobile computing device 110 is linked to the hardware device 112 and the network/system 117, the user may order additional services, features, modify billing address information, update user profile information, and the like.

According to another embodiment, the mobile computing device 110 may be utilized for authenticating within a home. That is, when the mobile computing device is within a specified range of a network (e.g., home network), a synchronization signal may be sent from the hardware device 112 (e.g., STB) to the mobile computing device 110 so that the user may be able to access the hardware device from the mobile computing device automatically. Additionally, the user may be able to utilize features that may be provisioned for the specified network (e.g., home network).

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1B:
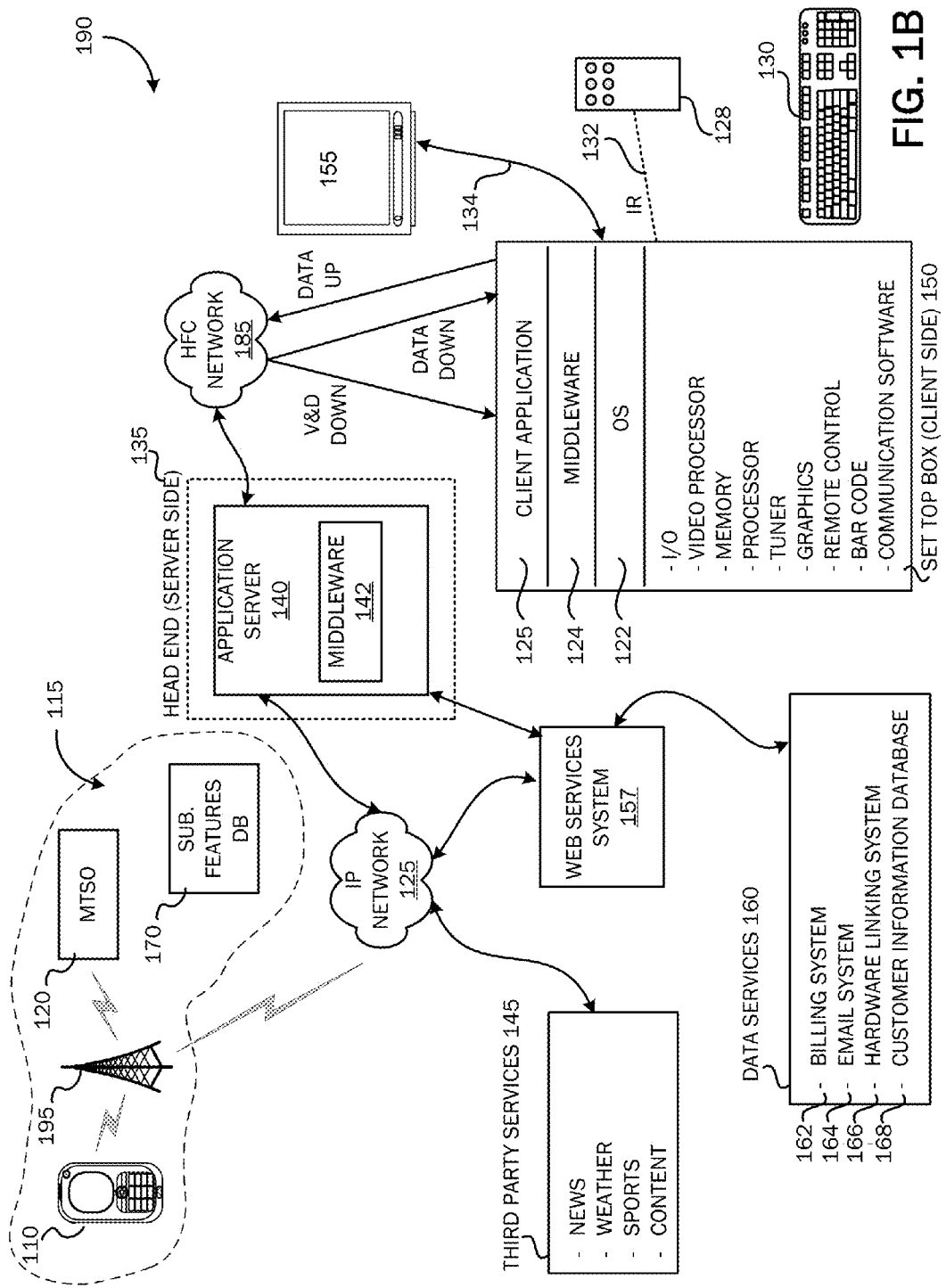
FIG. 1B is simplified block diagram illustrating a wireless communication network and a cable television/services (CATV) system architecture that serves as one example operating environment for the present invention.

As described above, the network/system 117 under which the hardware device 112 operates may be any system under which any hardware device operates that may be associated with a mobile computing device to allow the mobile computing device to control the hardware device and/or access information associated with the hardware device. For example the network/system 117 may include, but not be limited to, a cable television services (CATV) system, a Satellite TV (SATV) services system, an Internet services system (ISP), and the like. For purposes of illustration, FIG. 1B is simplified block diagram illustrating a wireless communication network 115 and a CATV network/system 117 that may serve as one exemplary operating environment for the present invention. As should be understood, the example network architectures illustrated in FIG. 1B are for purposes of example and are not limiting of a variety of communication configurations that may be utilized as described herein.

Referring now to FIG. 1B, wireless communications services are provided by various service provider companies through a wireless network 115. As is known to those skilled in the art, wireless networks may consist of but not be limited to cellular towers 195, base stations, and a Mobile Telephone Switching Office (MTSO) 120. As is known to those skilled in the art, a cellular tower 195 typically consists of a steel pole or lattice structure outfitted with antennae for transmitting and receiving signals to and from mobile computing devices, other cellular towers, and the MTSO. Each cellular tower 195 may have multiple sets of antenna mounted, depending upon how many different service providers use the tower 195. The base of each cellular tower 195 includes sets of transmitters and receivers from each service provider having antennae mounted to the tower 195. As a unit, the cellular tower 195 and the base form a system capable of transmitting, receiving, and managing data. This data may consist of, but not be limited to, voice, text, and/or electronic media. As is understood by those skilled in the art, wireless systems typically operate at various frequencies (e.g., across a frequency range from 800 megahertz (MHz) to 1900 MHz), depending upon which wireless technology is utilized. According to the embodiments of the present invention, mobile computing device 110 to hardware device 112 linking may operate across this typical network of wireless systems, and therefore, in the same frequency ranges.

Referring still to FIG. 1B, an MTSO 120 serves as a central control center for the base stations operating in a given wireless communications area. For example, an MTSO 120 may be configured for controlling wireless communications for a wireless service provider operating in a specified city or other suitable operating area or region. In addition to other operating functions of the MTSO, according to embodiments of the present invention, the MTSO 120 may serve as control point for determining, providing and controlling subscriber features. For example, in accordance with embodiments of this invention, a customer information database 170 may contain data to allow a determination as to whether a particular feature or service is provisioned for a given wireless communications device account. An example of such a feature or service may be Caller ID, Call Waiting, Voicemail, or Data. Thus, if a command is made using a mobile computing device 110, a customer information database 170 may be parsed to determine which features to provision before completing desired command.

According to embodiments of the present invention, the example CATV system 190 is in the form of a distributed client-server computing system for providing video and data flow across the HFC network 185 between server-side service providers (e.g., cable television/service providers) via a server-side (backend) head end 135 and a client-side customer via a client-side set-top box (STB) functionally connected to a customer receiving device, such as the television set 155. As is understood by those skilled in the art, modern CATV systems 190 may provide a variety of services across the HFC network 185 including traditional digital and analog video programming, telephone services, high speed Internet access, video-on-demand, and information services.

As is known to those skilled in the art, HFC networks 185 combine both optical fiber and coaxial cable lines. Typically, optical fiber runs from the cable head end 135 to neighborhoods of 500 to 2,000 customers. Coaxial cable runs from the optical fiber feeders to each customer. According to embodiments of the present invention, the functionality of the HFC network 185 allows for efficient bidirectional data flow between the client-side set-top box 150 and the server-side application server 140 of the present invention.

On the client side of the CATV system 190, digital and analog video programming and digital and analog data are provided to the customer television set 155 via the set-top box (STB) 150. Interactive television services that allow a customer to input data to the CATV system 190 likewise are provided by the STB 150. As illustrated in FIG. 1, the STB 150 is a multipurpose computing device having a computer processor, memory and an input/output mechanism. The input/output mechanism of a STB 150 receives input from server-side processes via the HFC network 185 and from customers via input devices such as the remote control device 128 and the keyboard 130. The remote control device 128 and the keyboard 130 may communicate with the STB 150 via a suitable communication transport such as the infrared connection 132. The STB 150 also includes a video processor for processing and providing digital and analog video signaling to the television set 155 via a cable communication transport 134. A multi-channel tuner is provided for processing video and data to and from the STB 150 and the server-side head end system 135, described below.

The STB 150 also includes an operating system 122 for directing the functions of the STB 150 in conjunction with a variety of client applications 125. For example, if a client application 125 requires a news flash from a third-party news source to be displayed on the television 155, the operating system 122 may cause the graphics functionality and video processor of the STB 150, for example, to output the news flash to the television 155 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 190 for facilitating communication between the server-side application server and the client-side STB 150.

As is understood by those skilled in the art, the "in band" signaling space may operate across a variety of frequency ranges, for example, at a frequency between 54 and 1000 megahertz. The signaling space is generally divided into 6 megahertz channels in which may be transmitted a single analog signal or a greater number (e.g., up to ten) digital signals.

Referring still to FIG. 1B, the head end 135 of the CATV system 190 is positioned on the server side of the CATV system and includes hardware and software systems responsible for originating and managing content for distributing through the HFC network 185 to client-side STBs 150 for presentation to customers via televisions 155. As described above, a number of services may be provided by the CATV system 190, including digital and analog video programming, interactive television services, telephone services, video-on-demand services, targeted advertising, and provision of information content.

The application server 140 is a general-purpose computing system operative to assemble and manage data sent to and received from the client-side set-top box 150 via the HFC network 185.

As illustrated in FIG. 1B, the services provider data services 160 include a number of services operated by the services provider of the CATV system 190 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. A hardware linking system 166 may include information such as secure user names and passwords utilized by customers for access to network services and protocols for establishing a link.

The customer information database 168 may include general information about customers such as place of employment, business address, business telephone number and demographic information such as age, gender, educational level, and the like. The customer information database may also include information on products and services subscribed to by a customer from the cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1B, a web services system 157 is illustrated between the application server 140 and the data services 160. According to embodiments of the present invention, the web services system 157 serves as a collection point for data requested from each of the disparate data services systems comprising the data services 160. When the application server 140 requires customer profile data from one or more of the data services 160 for preparation or update of a customer profile, the application server 140 passes a data query to the web services system 157. The web services system formulates a data query to each of the available data services systems for obtaining any available data for a given customer as identified by a set-top box identification associated with the customer. The web services system 157 serves as an abstraction layer between the various data services systems and the application server 140. That is, the application server 140 is not required to communicate with the disparate data services systems, nor is the application server 140 required to understand the data structures or data types utilized by the disparate data services systems. The web services system 157 is operative to communicate with each of the disparate data services systems for obtaining necessary customer profile data. The customer profile data obtained by the web services system is assembled and is returned to the application server 140 for ultimate processing via the middleware layer 142, as described above.

According to embodiments of the present invention, a mobile computing device 110 may access the CATV system 190 via the wireless network 115, illustrated in FIG. 1B in order to access and utilize one or more applications, features, or services available to the user via the CATV system 190. The mobile computing device 110 may gain access to the desired applications, features, or services in a variety of suitable methods. According to one method, the mobile computing device 110 may access the CATV 190 via the IP network 125 to the Web Services System 157 and Data Services platform 160.

Figure 2:
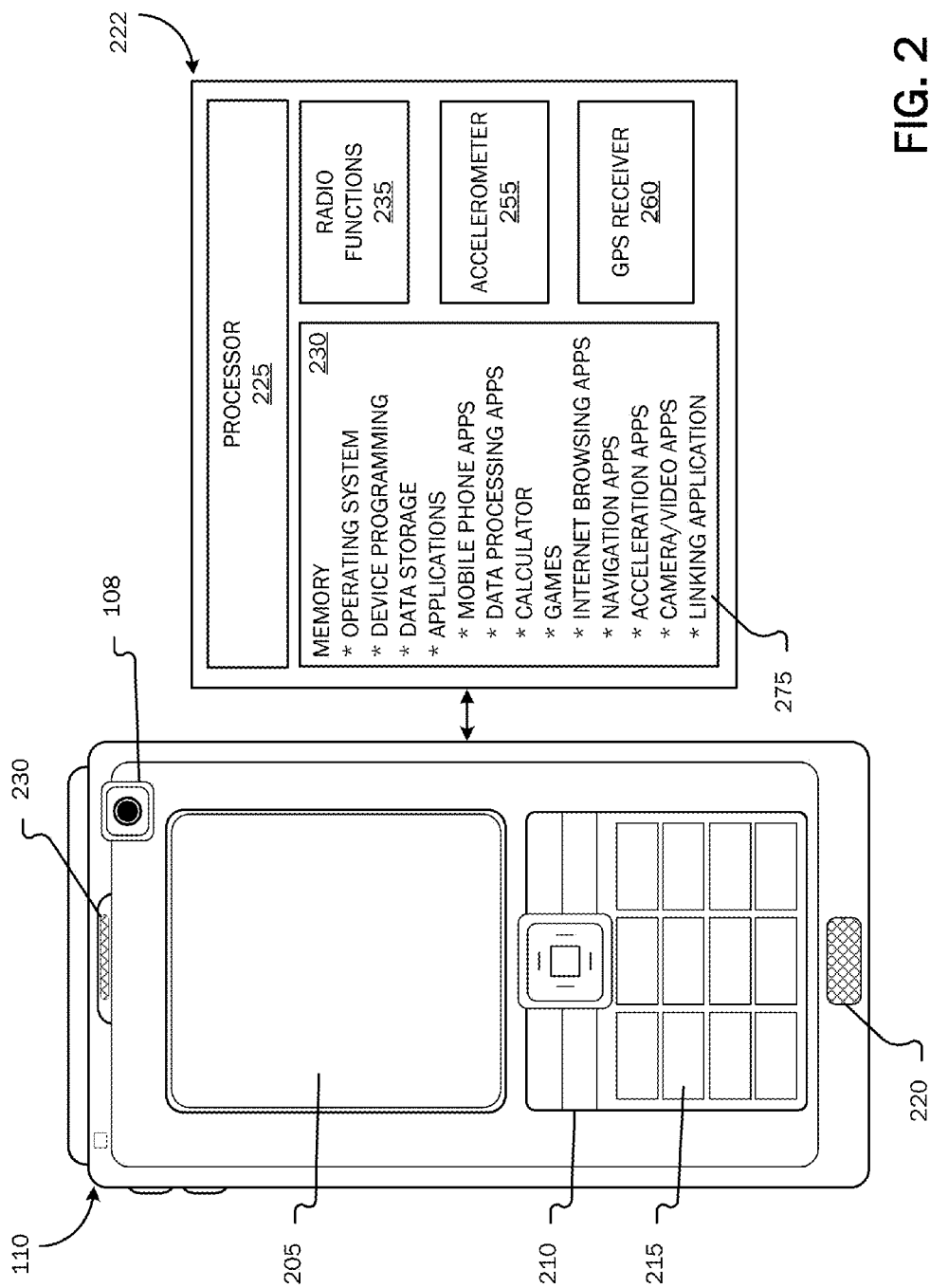
FIG. 2 is a simplified block diagram illustrating a mobile computing device with which embodiments of the present invention may be practiced.

Referring now to FIG. 2, a diagram of a mobile computing device 110 with which embodiments of the present invention may be practiced is illustrated. The mobile computing device 110 may operate via the wireless network 115 described above, or via other connectivity technologies, such as via WiFi, and is illustrative of any suitable device, such as a mobile telephone, personal digital assistant, smart phone, or handheld computer, operative to send, receive and process wireless communications according to embodiments of the present invention. As is understood by those skilled in the art, a mobile computing device 110 comprises, but is not limited to, an internal circuit board, antenna, operating system software, liquid crystal display (LCD), keyboard, microphone, speaker, and a battery. All of these components and systems making up a mobile computing device 110 work together to send, receive, and manage data within and beyond the cellular network.

A display screen 205 is operative for displaying a variety of information such as information about incoming and outgoing communications, as well as, a variety of data and displayable objects, for example, text, alphanumeric data, photographs, and the like.

Data input to the device 110 may be performed via a variety of suitable means, such as, touch screen input via the display screen 205, keyboard or keypad input via a data entry area 210, key input via one or more selectable buttons or controls 215, and voice input via a microphone 220 disposed on the device. According to embodiments, additional data input means include photographic input via an image capture mechanism 108 (e.g., camera) functionality associated with the mobile computing device, and including a transmission receiver for receiving data from a hardware device 112 via infrared communication, Bluetooth communication, Wireless Fidelity (Wi-Fi) communication, Radio Frequency Identification (RFID) communication, and the like. Data may be output via the device 110 via any suitable output means, including but not limited to, display on the display screen 205, audible output via an associated speaker 220 or connected earphone system, vibration module for providing tactile output, and the like.

Operational unit 222 is illustrative of internal operating functionality of the mobile computing device 110. A processor 225 is illustrative of a general-purpose computer processor for processing incoming and outgoing data and communications and controlling operation of the device and associated software applications via a mobile computing device operating system. Memory 230 may be utilized for storing a device operating system, device programming, one or more stored applications, for example, mobile telephone applications, data processing applications, calculators, games, Internet browsing applications, navigation applications, acceleration applications, camera and/or video applications, etc. According to embodiments, mobile computing device 110 may comprise a linking application 275, which may utilized to capture an image of a hardware device's 112 identification information 105 (e.g., barcode), and communicate the captured identification information as well as identification information associated with the mobile computing device to provide an association between the mobile computing device network 115 and the network 117 associated with the hardware device 112.

The mobile computing device 110 may contain an accelerometer 255 for detecting acceleration, and can be used to sense orientation, vibration, and/or shock. Mobile computing device 110 may contain a global positioning system (GPS) receiver 260, which when coupled with a navigation application, can pinpoint the device's 110 location, give directions to a provided destination, and may provide information about nearby businesses. A GPS receiver 260 uses radio waves to communicate with satellites orbiting the Earth. Radio functions 235 include all required functionality, including onboard antennae, for allowing the device 110 to communicate with other communication devices and systems via a wireless network.

Having described elements of a mobile computing device 110 that may serve as an exemplary device for embodiments of the present invention, FIGS. 3A, 3B, and 3C are illustrations of example application screenshots for linking a mobile computing device 110 to a hardware device 112. FIGS. 3A, 3B, and 3C show a touch screen device 110 wherein a standard user interface 205 is applied. As illustrated in FIG. 3A, an application may prompt a user of the mobile computing device 110 to associate/link a hardware device 112. As should be appreciated, the prompt illustrated in FIG. 3A may be automatically provided when the device 110 is brought into physical proximity to the hardware device 112 (for example, as determined by a GPS receiver 260 on board the mobile device 110), or the prompt 305 may be provided in response to manual action by the user of the mobile device 110 by activating the linking application 275 on the mobile computing device 110. It can be appreciated that numerous methods may be employed on the mobile computing device 110 to make the selection, such as touching an icon 305 on the user interface screen 205, using the key-pad 215, and the like.

After the user of the mobile computing device 110 begins the linking application and chooses to associate a hardware device 112, the hardware identification information 105 may be captured. The information 105 may be captured according to a variety of means as described above including photographic and data transmission capture. FIG. 3B illustrates an example user interface screenshot that may be displayed when capturing a bar code 105 of a desired hardware device 112 (e.g., set top box 150) using the device's 110 integrated camera 108. Upon successfully capturing the information 105 and communicating the identification information over the appropriate networks 115, 125, a screen shot, such as the example screen shot illustrated in FIG. 3C may be displayed. As shown in FIG. 3C, a user may be prompted to enter a description for an association made between the mobile computing device 110 and the selected hardware device 112 and associated network/system 117.

Figure 4A:
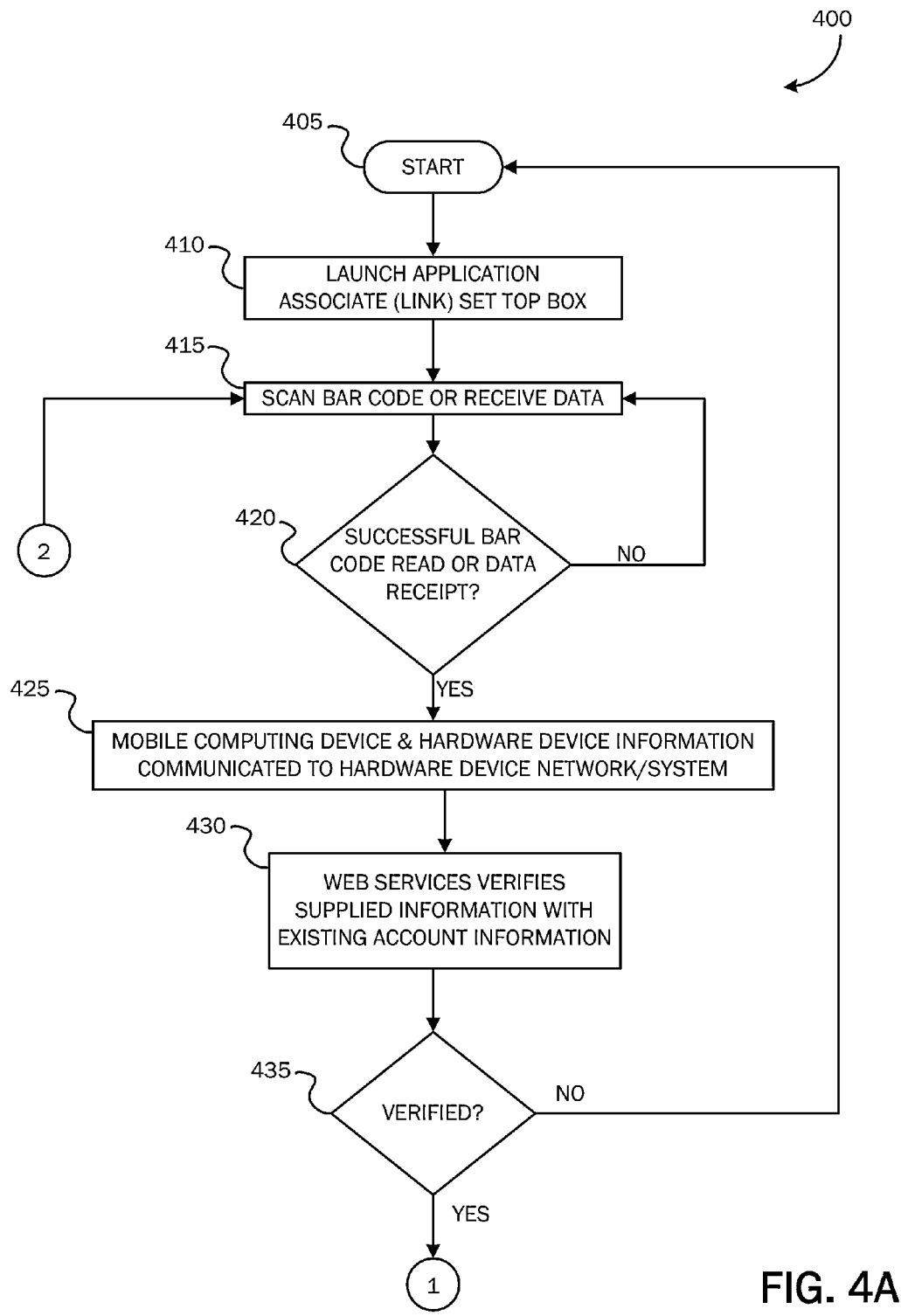
FIGS. 4A, 4B are flow diagrams showing an illustrative routine linking a mobile computing device to a hardware device via multiple networks.
Figure 4B:
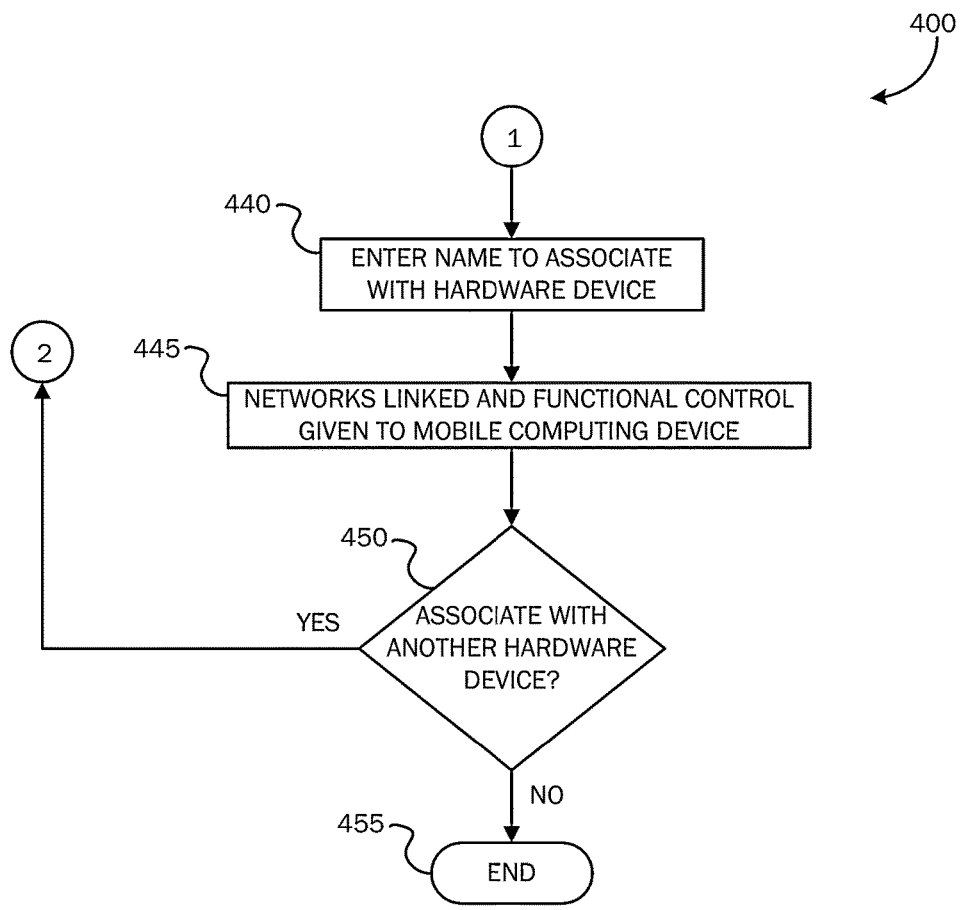

Having described exemplary operating environments for embodiments of the invention, FIGS. 4A and 4B are flow diagrams showing an illustrative method 400 for associating or linking a mobile computing device 110 to a hardware device 112 operating on a separate network/system 117. The method 400 begins at start OPERATION 405 and proceeds to OPERATION 410 where a linking application 275 may be launched on a user's mobile computing device 110. At OPERATION 415, a user interface element may be displayed on the mobile computing device 110 which may be utilized to aid in scanning or requesting via transmission identification information 105 of a hardware device 112 (e.g., set-top box 150). According to embodiments, identification information 105 may be captured via various technologies described above.

The method 400 proceeds to DECISION OPERATION 420, where a determination may be made as to whether the scan or data transmission from the hardware device 112 to the mobile computing device 110 was successful. Upon a successful scan or data transmission, the routing continues to OPERATION 425 where the hardware device identification information 105 in the form of the bar code information or transmitted data, as well as, identification information for the mobile computing device 110 may be communicated to the hardware device controlling network/system 117. For example, the identification information for both the hardware device and the mobile computing device may be communicated to a CATV system 190 via a CATV web services system 157. For example, a MAC ID for both a set-top box 150 and for a mobile computing device's 110 may be communicated to a CATV system 190 via a web services system 157 to associate the particular mobile computing device 110 with the particular set-top box 150 so that the mobile computing device 110 will be able to control the set-top box 150 and access account information via the set-top box 150.

At OPERATION 430, the network/system 117, for example the CATV 190 and associated web services system 157, may verify the information provided with existing account information to ensure the user of the mobile computing device 110 may be authorized to have access and functional control over the identified hardware device and associated account information, for example, a given CATV account, features, and set-top box 150. At DECISION OPERATION 435, a determination is made as to whether the verification is successful. If the verification is successful, the mobile computing device is registered with the second network system in association with the hardware device associated with the second network system for allowing control functionalities associated with the hardware device and the associated second network system to be performed via the mobile computing device via the first network system. In addition, by registering the mobile computing device with the second network, the functionalities and systems, including account information, may be accessed by the mobile computing device via the associated hardware device 112.

If the verification is not successful, the method returns to start OPERATION 405, otherwise the method continues to OPERATION 440. At OPERATION 440, the user may be prompted to enter a name or description to associate with the selected hardware device 112. For example, a set-top box 150 in a home living room may be named "living room," and a second set-top box in a home bedroom may be named "bedroom." At OPERATION 445, functional control may be given to the mobile computing device 110. For example, a user may utilize a mobile computing device 110 to access one or more set-top boxes 150 within his/her home. Various functionalities may be provided to allow a user to utilize a mobile computing device 110 linked to a hardware device 112 (e.g., set-top box 150) to check tuners within a home, to record and control set-top boxes within a home, view program guides associated with a services system, and view landline caller ID information. As should be appreciated, various other functionalities may be provided, including allowing the user to access and edit, as desired, account information associated with the hardware device 112.

At OPERATION 450, the user of the mobile computing device 110 may associate the mobile computing device with another hardware device 112, if desired, and the method returns to OPERATION 415, as described above. After all desired hardware devices 112 are associated with the mobile computing device 110, the method ends at OPERATION 455.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of linking a mobile communications device associated with a wireless communications system to a cable television services system via a cable television services system set-top box, the method comprising:
   providing a set-top box for each user of a plurality of users subscribing to receive service via the set-top boxes over the cable television services system;
   at the mobile communications device of a user subscribing to receive service via the set-top box, capturing identification information associated with the set-top box wherein the user's set-top box is associated with the cable television services system;
   communicating to the cable television services system via the mobile communications device the captured identification information associated with the set-top box that is associated with the cable television services system and communicating to the cable television services system via the mobile communications device identification information associated with the mobile communications device that is associated with the wireless communications system;
   based on the captured identification information, registering the mobile communications device with the cable television services system in association with the set-top box to control the services from the cable television services system via functionality associated with the set-top box; and
   allowing control functionalities associated with the set-top box and the associated cable television services system to be performed via the registered mobile communications device via the wireless communications system in order to control services from the cable television services system.

2. The method of claim 1, wherein capturing identification information associated with the set-top box associated with the cable television services system includes capturing the identification information via an image capture mechanism associated with the mobile communications device.

3. The method of claim 2, wherein capturing identification information associated with the set-top box associated with the cable television services system includes capturing an image of a barcode affixed to the set-top box via a camera associated with the mobile communications device.

4. The method of claim 1, wherein capturing identification information associated with the set-top box associated with the cable television services system includes capturing the identification information via data transmission from the set-top box to the mobile communications device.

5. The method of claim 4, wherein capturing the identification information via data transmission from the set-top box to the mobile communications device includes capturing the identification information via one of wireless communication, infrared communication, Bluetooth communication, Wireless Fidelity (Wi-Fi) communication, and Radio Frequency Identification (RFID) communication.

6. The method of claim 1, wherein allowing control functionalities associated with the set-top box and the associated cable television services system to be performed via the mobile communications device via the wireless communications system includes allowing utilization of the mobile communications device for:

checking a status of an account associated with the cable television services system;

checking settings of an account associated with the cable television services system;

selecting programming of an account associated with the cable television services system;

programming the set-top box associated with the cable television services system;

viewing caller identification information of a land line telephone associated with the cable television services system; and authenticating access to the set-top box via the mobile communications device based on a location of the mobile communications device within a specified range of the set-top box.

7. A system for linking a mobile computing device associated with a network system to a cable television services system, the system comprising:

a mobile computing device configured to capture identification information associated with a set-top box associated with the cable television services system, to communicate to the cable television services system via the mobile computing device the captured identification information associated with the set-top box associated with the cable television services system, and to communicate to the cable television services system via the mobile computing device identification information associated with the mobile computing device associated with the network system; and the cable television services system configured to provide services to a plurality of users via a plurality of set-top boxes and, based on the captured identification information, configured to register the mobile computing device in association with the set-top box of a user to control the services from the cable television services system via functionality associated with the set-top box and configured to allow control functionalities associated with the set-top box and the associated cable television services system to be performed via the registered mobile computing device via the network system in order to control the services from the cable television services system.

8. The system of claim 7, wherein the mobile computing device captures the identification information via an image capture mechanism associated with the mobile computing device.

9. The system of claim 8, wherein the mobile computing device captures an image of a barcode affixed to the set-top box.

10. The system of claim 7, wherein the mobile computing device captures the identification information via data transmission from the set-top box to the mobile computing device.

11. The system of claim 7, wherein the cable television services system allows utilization of the mobile computing device for:

checking a status of an account associated with the set-top box;

checking settings of an account associated with the cable television services system;

selecting programming of an account associated with the cable television services system;

programming the set-top box associated with the cable television services system;

viewing caller identification information of a land line telephone associated with the cable television services system; and authenticating access to cable television services system via the mobile computing device based on a location of the mobile computing device within a specified range of the cable television services system.

12. The system of claim 7, wherein the cable television services system facilitates management of one or more other computing devices associated with the cable television services system where association of the one or more computing devices with the cable television services system may be performed by linking the one or more other computing devices to the cable television services system.

\* \* \* \* \*